US012010494B1

(12) United States Patent
Satongar et al.

(10) Patent No.: US 12,010,494 B1
(45) Date of Patent: Jun. 11, 2024

(54) AUDIO SYSTEM TO DETERMINE SPATIAL AUDIO FILTER BASED ON USER-SPECIFIC ACOUSTIC TRANSFER FUNCTION

(71) Applicant: Apple Inc., Cupertino, CA (US)

(72) Inventors: Darius A. Satongar, Santa Clara, CA (US); Martin E. Johnson, Los Gatos, CA (US); Peter Victor Jupin, Copenhagen (DK); Jonathan D. Sheaffer, Santa Clara, CA (US); Gaëtan R. Lorho, Menlo Park, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/557,907

(22) Filed: Aug. 30, 2019

Related U.S. Application Data

(60) Provisional application No. 62/737,728, filed on Sep. 27, 2018.

(51) Int. Cl.

| | |
|---|---|
| ***G06F 17/00*** | (2019.01) |
| ***H04R 1/10*** | (2006.01) |
| ***H04R 3/04*** | (2006.01) |
| ***H04R 5/04*** | (2006.01) |
| ***H04S 7/00*** | (2006.01) |

(52) U.S. Cl.
CPC ............. *H04R 5/04* (2013.01); *H04R 1/1008* (2013.01); *H04R 3/04* (2013.01); *H04S 7/304* (2013.01); *H04S 7/307* (2013.01); *H04S 2420/01* (2013.01)

(58) Field of Classification Search
CPC .......... H04R 1/1008; H04R 3/04; H04R 5/04; H04S 7/304; H04S 7/307; H04S 2420/01
USPC ........................................................... 700/94
See application file for complete search history.

(56) References Cited

U.S. PATENT DOCUMENTS

| | | | | |
|---|---|---|---|---|
| 6,256,386 | B1 * | 7/2001 | Phillips | H04M 1/05 379/430 |
| 7,406,179 | B2 * | 7/2008 | Ryan | H04R 1/10 381/312 |
| 9,578,415 | B1 * | 2/2017 | Zhou | G10K 11/17823 |
| 9,747,887 | B2 * | 8/2017 | O'Connell | G10K 11/17817 |
| 9,918,177 | B2 | 3/2018 | Horbach | |
| 10,142,733 | B2 * | 11/2018 | Fujii | H04S 5/02 |
| 10,382,864 | B2 * | 8/2019 | Alderson | H04R 3/04 |

(Continued)

FOREIGN PATENT DOCUMENTS

WO WO2017161383 A2 9/2017

OTHER PUBLICATIONS

HRTF Wikipedia page available 8/18 (Year: 2018).*

*Primary Examiner* — Paul C McCord
(74) *Attorney, Agent, or Firm* — Aikin & Gallant, LLP

(57) ABSTRACT

An audio system and a method of using the audio system to determine one or more of a head-related transfer function (HRTF) or a headphone equalization (HpEQ) filter for a user, are described. The audio system can determine an acoustic transfer function that relates an output signal detected by a microphone of a headphone worn by the user to an in input signal played by a speaker of the headphone. The acoustic transfer function corresponds to sound reflecting from a pinna of the user between the speaker and the microphone, and accordingly, the acoustic transfer function is user-specific. The user-specific acoustic transfer function can be used to determine the HRTF or the HpEQ filter for the user. Other aspects are also described and claimed.

21 Claims, 5 Drawing Sheets

(56) References Cited

U.S. PATENT DOCUMENTS

| | | | | |
|---|---|---|---|---|
| 10,652,686 | B2 * | 5/2020 | Wardle | H04S 7/303 |
| 2014/0044275 | A1 * | 2/2014 | Goldstein | H04R 1/1083<br>381/71.6 |
| 2014/0072135 | A1 * | 3/2014 | Bajic | G10K 11/17854<br>381/71.11 |
| 2014/0311499 | A1 * | 10/2014 | Lee | G10K 11/17861<br>128/866 |
| 2014/0341388 | A1 * | 11/2014 | Goldstein | G10K 11/17827<br>381/71.11 |
| 2015/0223002 | A1 * | 8/2015 | Mehta | H04S 7/30<br>381/303 |
| 2015/0243271 | A1 * | 8/2015 | Goldstein | G10K 11/17854<br>381/71.6 |
| 2015/0289064 | A1 * | 10/2015 | Jensen | H04R 25/407<br>381/317 |
| 2016/0365082 | A1 * | 12/2016 | Poulsen | G10K 11/1785 |
| 2017/0094386 | A1 * | 3/2017 | Trainer | G10K 11/178 |
| 2017/0156017 | A1 * | 6/2017 | Gamper | G02B 27/017 |
| 2017/0195793 | A1 * | 7/2017 | Vilermo | H04R 29/004 |
| 2017/0245040 | A1 * | 8/2017 | Hankey | H04R 1/1025 |
| 2017/0272867 | A1 * | 9/2017 | Zisapel | H04R 25/305 |
| 2017/0295445 | A1 * | 10/2017 | Christoph | H04S 7/301 |
| 2018/0077511 | A1 | 3/2018 | Mehta et al. | |
| 2018/0132764 | A1 * | 5/2018 | Jain | G06T 7/80 |
| 2018/0324516 | A1 * | 11/2018 | Campbell | H04R 1/10 |
| 2019/0069068 | A1 * | 2/2019 | Villasenor | H04R 1/1041 |
| 2019/0246217 | A1 * | 8/2019 | Miller | H04R 1/1016 |
| 2019/0373357 | A1 * | 12/2019 | Khaleghimeybodi | H04R 1/1058 |
| 2019/0394564 | A1 * | 12/2019 | Mehra | H04S 7/30 |
| 2020/0184057 | A1 * | 6/2020 | Mukund | H04L 63/0861 |

* cited by examiner

AUDIO SYSTEM TO DETERMINE SPATIAL AUDIO FILTER BASED ON USER-SPECIFIC ACOUSTIC TRANSFER FUNCTION

This application claims the benefit of priority of U.S. Provisional Patent Application No. 62/737,728, filed on Sep. 27, 2018, and incorporates herein by reference that provisional patent application.

BACKGROUND

Field

Aspects related to audio systems, are disclosed. More particularly, aspects related to audio systems used to render spatial audio, are disclosed.

Background Information

Spatial audio can be rendered using headphones that are worn by a user. For example, the headphones can reproduce a spatial audio signal that simulates a soundscape around the user. An effective binaural audio reproduction can convince the user that the user is not wearing headphones. More particularly, sounds are ideally rendered such that the user perceives sound sources within the soundscape external to the user's head, just as the user would experience the sounds if encountered in the real world.

When a sound travels to a listener from a surrounding environment, the sound propagates along a direct path, e.g., through air to the listeners ear canal entrance, and along one or more indirect paths, e.g., by reflecting and diffracting around the listeners head or shoulders. As the sound travels along the indirect paths, artifacts can be introduced into the acoustic signal that the ear canal entrance receives. These artifacts are anatomy dependent, and accordingly, are user-specific. The user therefore perceives the artifacts as natural. Accordingly, the artifacts can be reproduced when rendering a soundscape to provide an accurate binaural reproduction to the user.

User-specific artifacts can be incorporated into binaural audio by signal processing algorithms that use spatial audio filters. The audio filters can be applied to an input signal to shape a frequency response in a way that simulates a sound traveling to the user from a surrounding environment. For example, a head-related transfer function (HRTF) contains all of the acoustic information required to describe how sound reflects or diffracts around a listener's head before entering their auditory system. Similarly, a headphone equalization (HpEQ) filter contains acoustic information to compensate for effects of a listener's outer ear, e.g., a pinna of the listener, on sound generated by a headphone driver worn by the listener. The HRTF and HpEQ filter can be encapsulated in respective datasets. A listener can use simple stereo headphones to create the illusion of a sound source somewhere in a listening environment by applying the HRTF and the HpEQ filter to a binaural recording of the sound source.

SUMMARY

Existing binaural reproduction methods include choosing a head-related transfer function (HRTF) or a headphone equalization (HpEQ) filter for a listener based on similarities between the listener and one or more other people. For example, an HpEQ filter may be integrated in circuitry of a pair of headphones to shape a frequency response toward a general target for all listeners. In reality, HRTFs and HpEQ filters are highly individualized, however, and binaural simulation using general, non-individualized, HRTFs or HpEQ filters (for example when a listener auditions a simulation using the audio filter dataset of another person or a population) can cause audible problems in both the perceived position and quality (timbre) of the virtual sound. As such, an HRTF or an HpEQ filter that effectively simulates a sound source at a location relative to a first user may not effectively simulate the sound source at the same relative location to a second user. That is, the first user may experience the simulation as a realistic rendering, but the second user may not.

An audio system and a method of using the audio system to determine one or more of an HRTF or an HpEQ filter, which are personalized for a user, are described. By applying a personalized HRTF and HpEQ filter of the user to an input audio signal, a user-specific spatial audio signal can be generated and played for the user. When reproduced, the spatial audio can provide an accurate binaural reproduction to the user.

The method of using the audio system to determine one or more of an HRTF or an HpEQ filter can include driving a speaker of a headphone, e.g., an earcup or an earbud of a pair of headphones, with a first input signal while a user is wearing the headphones. The speaker can generate a sound corresponding to the input signal, and a microphone of the headphone can detect the sound after the sound reflects from a pinna of the user. The sound is detected as an output signal, and the audio system can determine an acoustic transfer function that relates the output signal detected by the microphone to the input signal played by the speaker. More particularly, the acoustic transfer function can correspond to an impulse response of the headphone and pinna system, and accordingly, the acoustic transfer function can be specific to the user. The audio system can use the user-specific acoustic transfer function to determine one or more audio filters for the headphone. For example, a head-related transfer function (HRTF) or a headphone equalization (HpEQ) filter can be determined for the user based on the acoustic transfer function. The audio filters can be generated or selected. For example, the acoustic transfer function can be inverted to generate the HpEQ filter. Alternatively, the acoustic transfer function can be matched to a predetermined transfer function of others, and an HRTF or HpEQ corresponding to the matching transfer function of others can be selected as an audio filter for the user.

The audio filter(s) that are determined based on the user-specific acoustic transfer function, e.g., one or more of the HRTF or the HpEQ, can be applied to a second input signal. The second input signal may be a different portion of a user content signal than the first input signal. Application of the audio filters to the second input signal can generate a spatial input signal. The spatial input signal can be specific to the user. Accordingly, the speaker can be driven with the spatial input signal to generate a spatialized sound that realistically simulates an externalized sound source in a soundscape around the user.

The above summary does not include an exhaustive list of all aspects of the present invention. It is contemplated that the invention includes all systems and methods that can be practiced from all suitable combinations of the various aspects summarized above, as well as those disclosed in the Detailed Description below and particularly pointed out in the claims filed with the application. Such combinations have particular advantages not specifically recited in the above summary.

DETAILED DESCRIPTION

Figure 1:
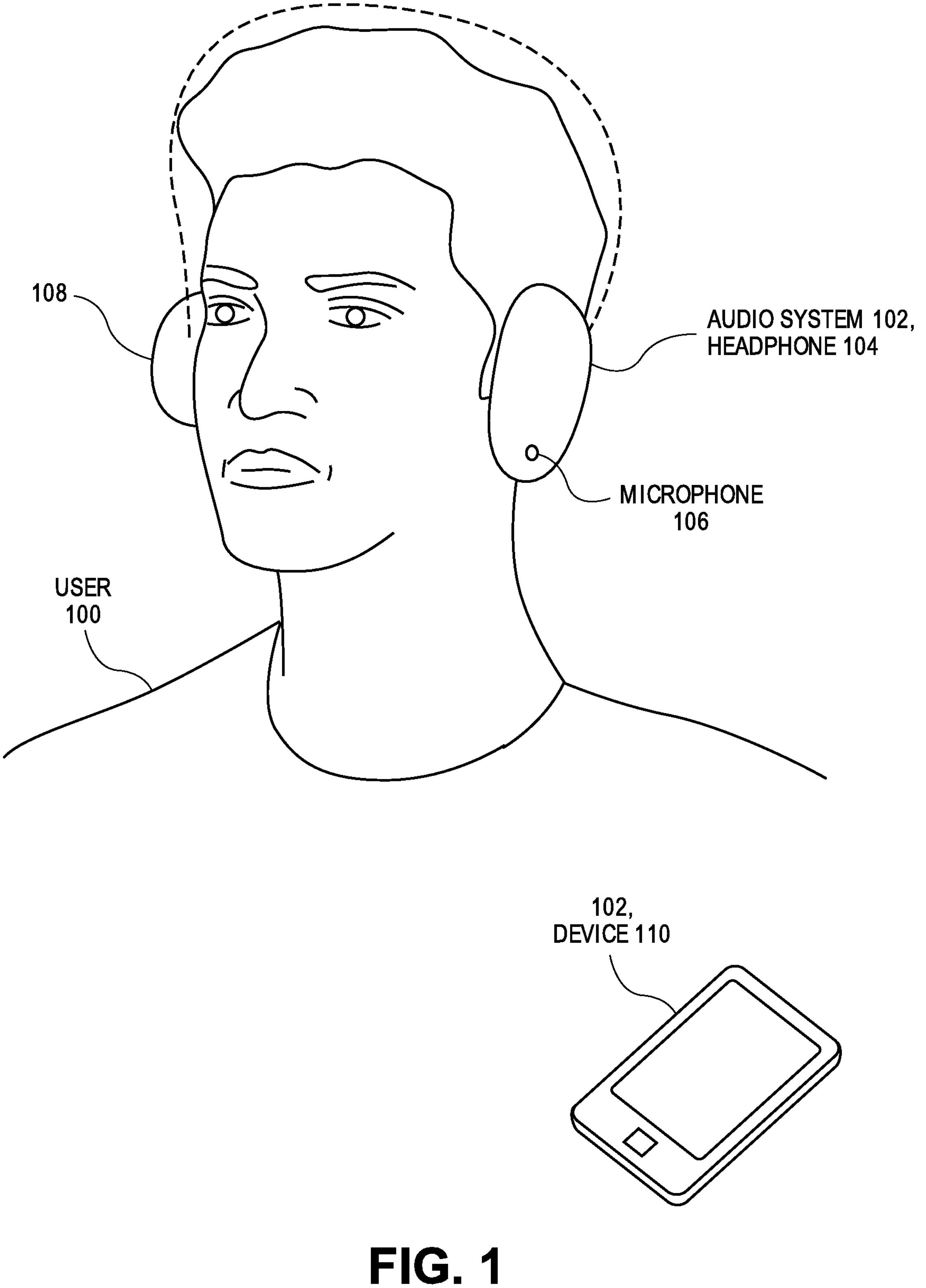
FIG. 1 is a pictorial view of a user listening to an audio system, in accordance with an aspect.

Aspects describe an audio system and a method of using the audio system to determine one or more of a head-related transfer function (HRTF) or a headphone equalization (HpEQ) filter that is personalized for a user. The audio system can incorporate a pair of headphones, and each headphone can have a speaker and a microphone. For example, the headphones can be circumaural headphones having the microphone in an interior of an earcup. The audio system may, however, include other devices for rendering audio to the user, including: other types of headphones such as earbuds or, a headset; or another head-mounted consumer electronics product, such as a motorcycle helmet, to name only a few possible applications.

In various aspects, description is made with reference to the figures. However, certain aspects may be practiced without one or more of these specific details, or in combination with other known methods and configurations. In the following description, numerous specific details are set forth, such as specific configurations, dimensions, and processes, in order to provide a thorough understanding of the aspects. In other instances, well-known processes and manufacturing techniques have not been described in particular detail in order to not unnecessarily obscure the description. Reference throughout this specification to "one aspect," "an aspect," or the like, means that a particular feature, structure, configuration, or characteristic described is included in at least one aspect. Thus, the appearance of the phrase "one aspect," "an aspect," or the like, in various places throughout this specification are not necessarily referring to the same aspect. Furthermore, the particular features, structures, configurations, or characteristics may be combined in any suitable manner in one or more aspects.

The use of relative terms throughout the description may denote a relative position or direction. For example, "in front of" may indicate a first direction away from a reference point. Similarly, "behind" may indicate a location in a second direction away from the reference point and opposite to the first direction. Such terms are provided to establish relative frames of reference, however, and are not intended to limit the use or orientation of an audio system to a specific configuration described in the various aspects below.

In an aspect, an audio system includes headphones having internally and/or externally mounted microphone(s) that are used to personalize an HRTF and/or HpEQ filter for a user. By driving a speaker of the headphones with an input signal, a sound can be generated that reflects from a pinna of a user wearing the headphones. The microphone(s) can detect the reflected sound as an output signal that correlates to the input signal. The audio system can determine an acoustic transfer function that relates the output signal to the input signal. Given that the acoustic transfer function is specific to an anatomy of the user, e.g., the pinna shape, the acoustic transfer function is user-specific. The user-specific acoustic transfer function can be used by the audio system to determine one or more spatial audio filters, such as an HRTF or an HpEQ filter, for the user. For example, the spatial audio filters can be selected or constructed by the audio system based on the user-specific acoustic transfer function. Accordingly, the personalized HRTF and HpEQ filter can be applied to the input signal to generate a spatial input signal that accurately renders spatial audio to the user.

Referring to FIG. 1, a pictorial view of a user listening to an audio system is shown in accordance with an aspect. A user 100 of an audio system 102 can listen to audio, such as music, binaural audio reproductions, phone calls, etc., emitted by one or more headphones 104. More particularly, audio system 102 can include headphones 104 having one or more speakers to play an audio signal. Headphones 104 can include several earphones, and each headphone (earphone) may be physically connected, e.g., by a headband or neck cord. For example, headphones 104 can be circumaural headphones or supra-aural headphones having several earphones, e.g., a first headphone and a second headphone, connected by a headband. Alternatively, headphones 104 can be earbuds having several earphones connected by a neck cord. In an aspect, each headphone of headphones 104 may not be physically coupled to the other headphone, such as in the case of wireless earbuds.

Audio system 102 can include one or more microphones 106. Microphone(s) 106 may be built into headphones 104 to detect sounds internal to and/or external to the earphone. For example, headphones 104 may be circumaural headphones having a pair of earcups 108 (or earbuds having a first earbud and a second earbud). One or more microphones 106 can be mounted on each earcup 108 facing a surrounding environment. Similarly, one or more microphones 106 may be mounted within an interior of earcup 108, e.g., on an internal surface of earcup 108. Microphone(s) 106 can generate microphone output signals based on the detected sounds. For example, microphones 106 on an exterior of earcup 108 can generate microphone output signals corresponding to sounds traveling toward user 100 from a surrounding environment. Similarly, microphones 106 contained within an interior of earcup 108 can generate microphone output signals corresponding to sounds traveling within the interior between earcup 108 and an ear of user 100. Microphone output signals generated by microphones 106 can be used to model an acoustic path from a sound source, such as a voice, to microphones 106. For example, such modeling can be used in echo-cancellation algorithms for active noise canceling applications. As described below, the information from microphones 106 can also be used to determine acoustic transfer functions specific to user 100, which can inform a selection or construction of audio filters for audio rendering.

In an aspect, audio system 102 includes a device 110, such as a mobile device, laptop, home stereo, etc. Device 110 can include circuitry to perform the functions described below. For example, device 110 can generate or transmit an input signal that is played by headphones 104. Furthermore, device 110 can receive signals from headphones 104, such as the microphone output signals from microphones 106, and use the signals to determine user-specific acoustic transfer functions and/or personalized audio filters for user 100. Accordingly, device 110 and headphones 104 can be connected wirelessly or by a wired connection to communicate signals used for audio rendering, e.g., binaural audio reproduction.

Figure 2:
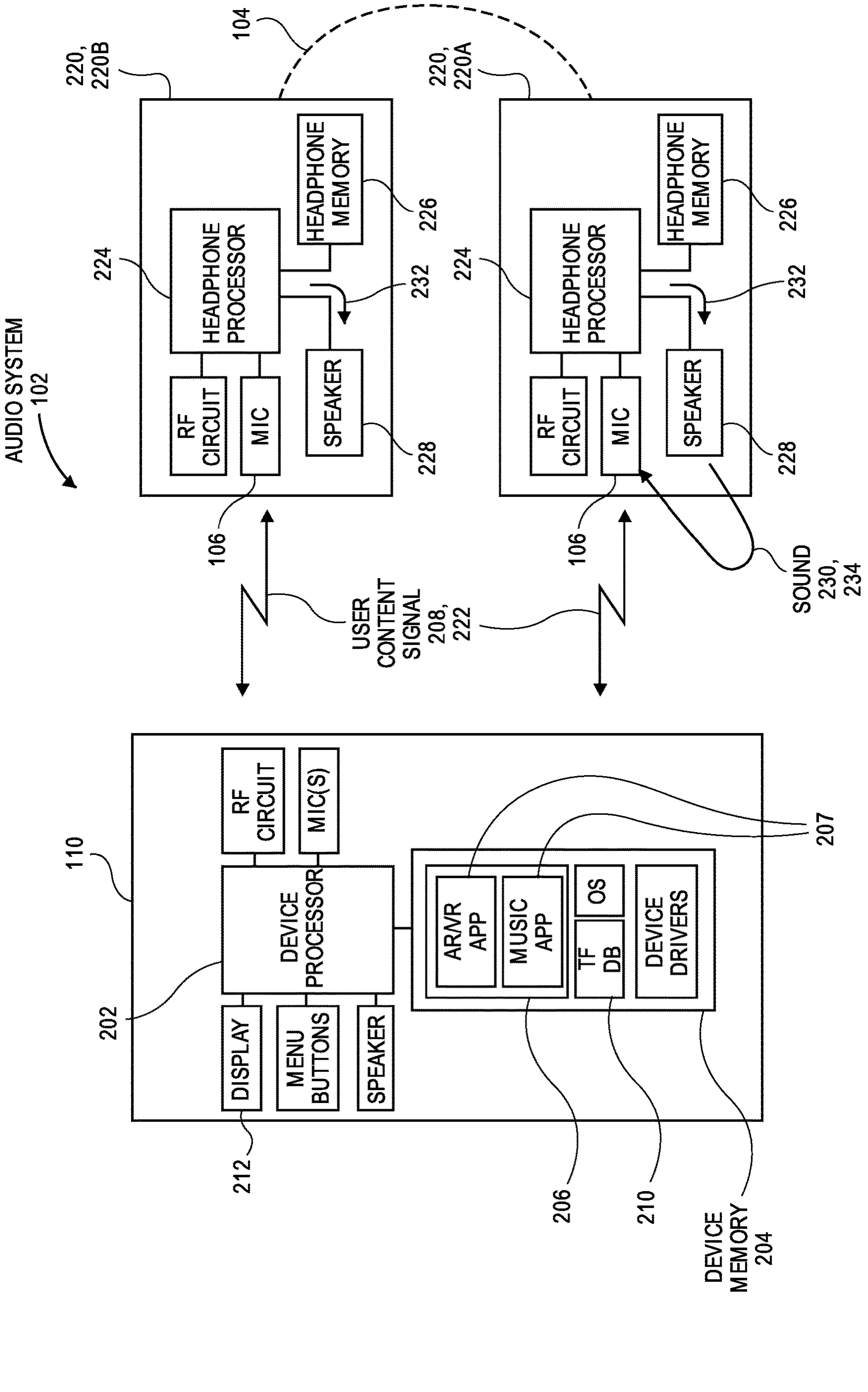
FIG. 2 is a block diagram of an audio system, in accordance with an aspect.

Referring to FIG. 2, a block diagram of an audio system is shown in accordance with an aspect. Audio system 102 can includes device 110, which can be a mobile device, e.g., any of several types of portable devices or apparatuses with circuitry suited to specific functionality. Accordingly, the diagrammed circuitry is provided by way of example and not limitation. Device 110 may include one or more device processors 202 to execute instructions to carry out the different functions and capabilities described below. Instructions executed by device processor(s) 202 of device 110 may be retrieved from a device memory 204, which may include a non-transitory machine readable medium. The instructions may be in the form of an operating system program having device drivers and/or an audio rendering engine for rendering music playback, binaural audio playback, etc., according to the methods described below.

Device processor(s) 202 can retrieve audio data 206 from device memory 204. Audio data 206 may be associated with one or more audio sources 207, including phone and/or music playback functions controlled by telephony or music application programs that run on top of the operating system. Similarly, audio data 206 may be associated with an augmented reality (AR) or virtual reality (VR) application program that runs on top of the operating system. The audio sources 207 can output user content signals 208 for playback by headphones 104.

In an aspect, device memory 204 stores audio filter data. For example, device memory 204 can store a transfer function database 210. Transfer function database 210 can include a dataset of generic or individualized transfer functions or filters, such as HRTFs or HpEQ filters. For example, a dataset of HRTFs can include several HRTFs that correspond to specific locations relative to user 100. A single HRTF of the dataset can be a pair of acoustic filters (one for each ear) that characterize the acoustic transmission from the particular location in a reflection-free environment to an entrance to an ear canal of user 100. The dataset of HRTFs encapsulate the fundamentals of spatial hearing of user 100. The dataset can include an HRTF filter that corresponds to an acoustic transfer function that is specific to user 100. Similarly, a dataset of HpEQ filters can include several HpEQ filters that correspond to acoustic transfer functions of one or more users. The acoustic transfer functions can correspond to anatomical characteristics of the user(s). The dataset can include an HpEQ filter that corresponds to an acoustic transfer function that is specific to user 100. Accordingly, determination of the user-specific acoustic transfer function can be used by device processor 202 to determine or select one or more of an HRTF or an HpEQ filter personalized for user 100.

To perform the various functions, device processor(s) 202 may directly or indirectly implement control loops and receive input signals from, and/or provide output signals to, other electronic components. For example, device 110 may receive input signals from microphone(s) or menu buttons of device 110, including through input selections of user interface elements displayed on a display 212. Device 110 can communicate system signals, such as user content signal 208, to headphone 104. More particularly, device 110 and headphones 104 can communicate wirelessly via respective RF circuitry, or through a wired connection.

Headphones 104 can include one or more headphone, e.g., a first headphone 220A and a second headphone 220B. Each headphone (earphone) 220, can be physically connected by a headband, a neck cord, or another physical connector (shown in phantom). Each earphone 220 may include a headphone processor 224 to perform one or more of the various functions described below. For example, headphone processor 224 can communicate with a headphone memory 226, which stores audio data 206, e.g., a cached portion of user content signal 208 received from device 110, an HRTF filter, and/or an HpEQ filter for a respective earphone 220. Headphone processor 224 can apply the HRTF filter and the HpEQ filter to the cached portion when rendering binaural playback to user 100 through the respective headphones. In an aspect, all functionality of system 102 can be performed by the components in headphones 104.

Each headphone 220 of headphones 104 can include a speaker 228 to output a sound 230 to user 100. More particularly, speakers 228 can receive an input signal 232 from device processor 202 and/or headphone processor 224. Input signal 232 can be a portion of user content signal 208. Input signal 232 can drive speaker 228 to generate sound 230, and emit sound 230 toward the ears of user 100. The ears may be contained within earcup 108 when user 100 is wearing circumaural headphones. At least a portion of sound 230 can reflect or diffract from a pinna of the ear (as represented by the curving path) and the reflected/diffracted sound 230 may be detected by microphone 106 mounted on headphones 104. For example, microphones 106 can detect the reflected sound 230 as an output signal 234. Output signal 234 can be a pressure at microphone 106, and can correspond to input signal 232. As described below, one or more processors of audio system 102, e.g., device processor 202 or headphone processor 224, can be configured to process the outputs of the one or more microphones 106 to determine an acoustic transfer function that relates output signal 234 to input signal 232. The acoustic transfer function can be used to inform the selection or construction of audio filters for user 100.

Figure 3:
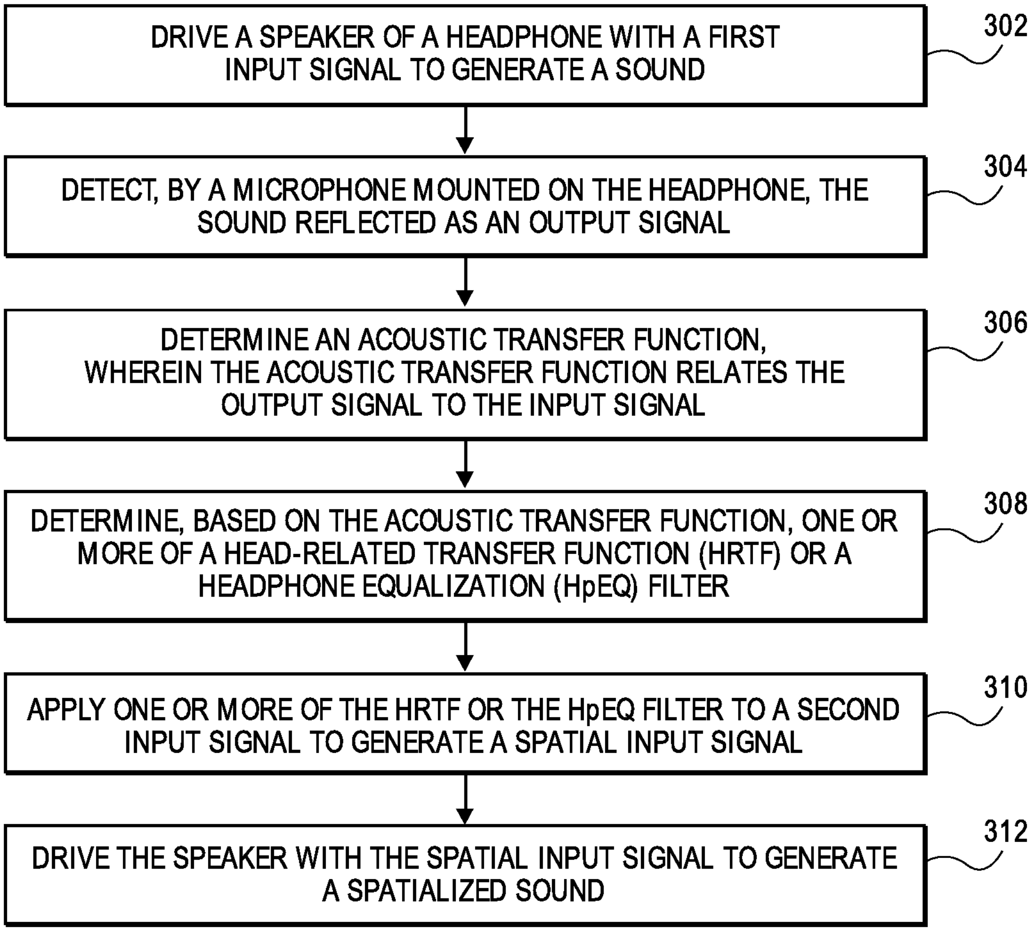
FIG. 3 is a flowchart of a method of determining a head-related transfer function or a headphone equalization filter, in accordance with an aspect.

Referring to FIG. 3, a flowchart of a method of determining an HRTF or a HpEQ filter is shown in accordance with an aspect. The operations of the method of FIG. 3 relate to aspects shown in FIGS. 4-7, and accordingly, FIGS. 3-7 are described in combination below.

At operation 302, speaker 228 of headphones 104 worn by user 100 is driven with input signal 232 to generate sound 230. Input signal 232 can be a first input signal provided to speaker 228 by headphone processor 224. The first input signal can be a portion of user content signal 208, e.g., music or binaural audio, intended for listening by user 100. Alternatively, the first input signal can be a test signal intended specifically for the purpose of determining a user-specific acoustic transfer function of user 100. In either case, the first input signal can have predetermined frequency content.

Figure 4:
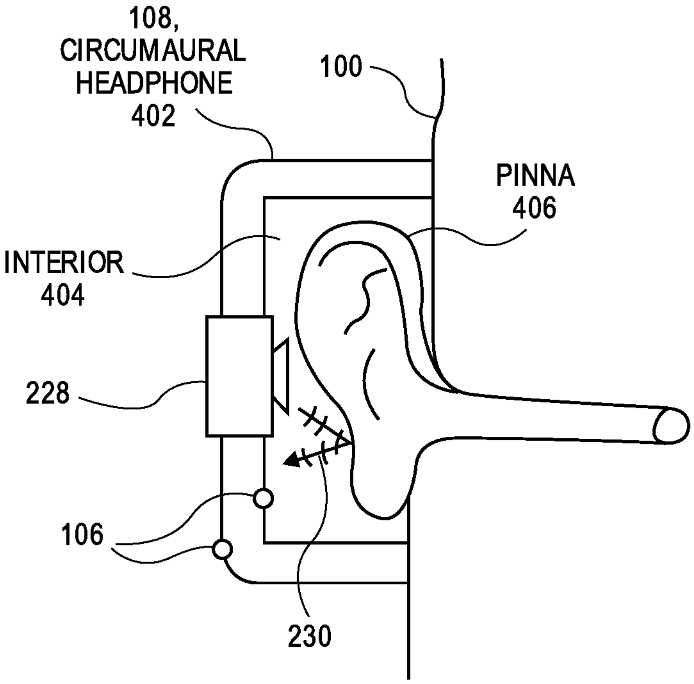
FIG. 4 is a pictorial view of a user wearing circumaural headphones, in accordance with an aspect.

Referring to FIG. 4, a pictorial view of a user wearing circumaural headphones is shown in accordance with an aspect. When speaker 228 is driven by the first input signal, sound 230 can be emitted toward the ear of user 100. In an aspect, headphones 104 are circumaural headphones 402 that enclose a pinna 406 of user 100. Sound 230 is emitted by speaker 228 into an interior 404 of earcup 108. Interior 404 of earcup 108 can be a volume of space between an internal surface of earcup 108 and the head and pinna 406 of user 100. Circumaural headphones 402 can have several microphones 106, e.g., at least one microphone 106 on the internal surface of earcup 108 and optionally one or more microphones 106 on an external surface of earcup 108.

Accordingly, speaker 228 and microphone 106 may be contained within interior 404 of earcup 108, and sound 230 can propagate from speaker 228 to microphone 106 along an acoustic path that reflects or diffracts from pinna 406.

Figure 5:
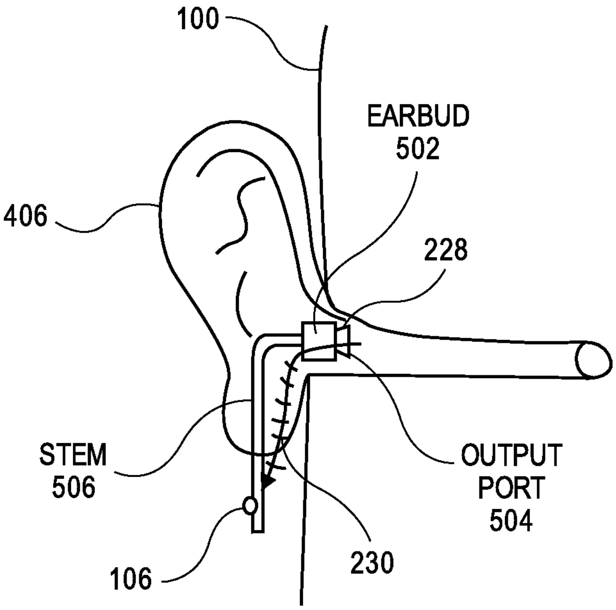
FIG. 5 is a pictorial view of a user wearing earbuds, in accordance with an aspect.

Referring to FIG. 5, a pictorial view of a user wearing earbuds is shown in accordance with an aspect. When speaker 228 is driven by the first input signal, sound 230 can be emitted out of the ear of user 100. In an aspect, headphones 104 are earbuds 502 placed in an outer ear of user 100. Sound 230 can be emitted by speaker 228 from an output port 504 of earbuds 502. More particularly, output port 504 of speaker 228 can face an ear canal of user 100, and thus, output port 504 can emit sound 230 internal to pinna 406. A portion of sound 230 can enter ear canal and a portion of sound 230 can propagate outward from output port 504 toward a surrounding environment. Earbuds 502 can include a stem 506 that extends distally from a casing of speaker 228, e.g., out of the outer ear of user 100. Stem 506 can extend outside of pinna 406. For example, stem 506 can extend downward below an ear lobe of pinna 406. At least one microphone 106 may be mounted on stem 506, e.g., at a location outside of pinna 406. Speaker 228 can be located on a first side of pinna 406, and microphone 106 can be located on another side of pinna 406. The outward propagating portion of sound 230 can travel from speaker 228 to microphone 106 along an acoustic path that reflects or diffracts from pinna 406. Accordingly, speaker 228 can play sound 230 internal to pinna 406, and microphone 106 can receive sound 230 external to pinna 406 of user 100.

At operation 304, microphone 106 can detect sound 230 reflected from pinna 406 as output signal 234. As described above, microphone 106 can receive sound 230 from a speaker placed internal to or external to pinna 406. Output signal 234 is an impulse response of the headphone/anatomical system of user 100 when input signal 232 is reproduced as sound 230. More particularly, the impulse response is dependent on the combination of headphones 104, geometry of pinna 406, and the interactions of headphones 104 and pinna 406 such as how well earcup 108 seals against a head of user. For example, when input signal 232 is played by speaker 228, sound 230 can transmit toward or through pinna 406 of user 100, and a portion of sound 230 can be reflected or diffracted from pinna 406 toward microphone 106. Similarly, a portion of sound 230 can be reflected or diffracted (as well as absorbed) by earcup 108 or earbud 502. The reflected/diffracted portion of sound 230 can be output signal 234 that is an input to microphone 106, and microphone 106 can generate a corresponding microphone output signal 222. Since output signal 234 defines the response of earcup 108 and/or pinna 406 to input signal 232, the impulse response depends on the unique anatomy of user 100 as is user-specific. The impulse response can be a signature of user 100 when wearing headphones 104.

Figure 6:
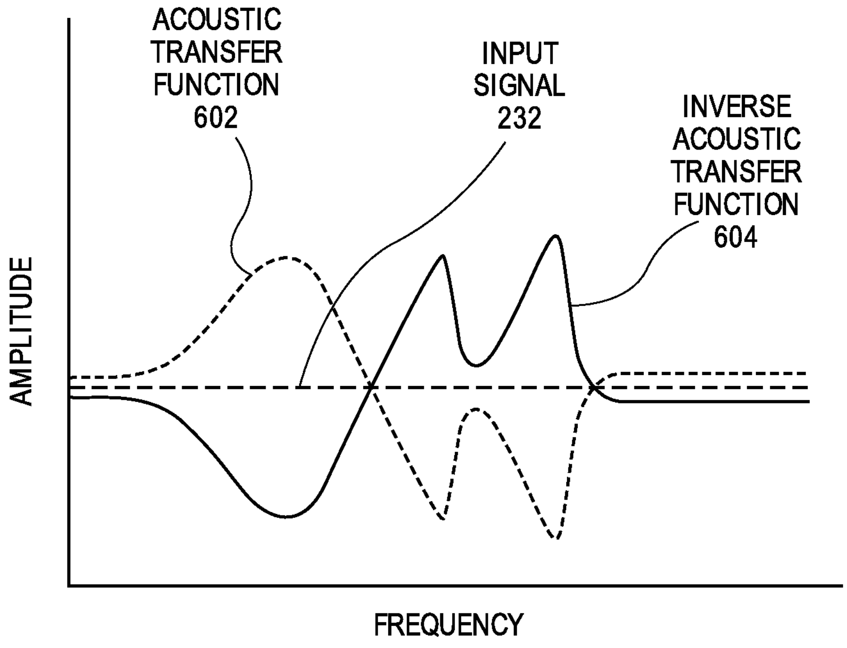
FIG. 6 is a graphical view of a user-specific acoustic transfer function, in accordance with an aspect.

Referring to FIG. 6, a graphical view of a user-specific acoustic transfer function is shown in accordance with an aspect. At operation 306, one or more processors of audio system 102, e.g., device processor 202 or headphone processor 224, determines an acoustic transfer function 602 specific to user 100. Acoustic transfer function 602 can relate output signal 234 detected by microphone 106 to input signal 232 played by speaker 228. For example, acoustic transfer function 602 can be represented by a frequency-domain graph, which shows a difference in amplitude between input signal 232 and output signal 234 across the audible frequency range. Input signal 232 is shown as being a test signal having a same amplitude across the frequency range. It will be understood, however, that the graph lines are provided by way of example and not limitation. That is, input signal 232 can have varying amplitudes over the frequency range, as would be the case when input signal 232 is a music or binaural audio signal. By determining an acoustic output for every frequency in the frequency range at every level, a complete acoustic transfer function 602 can be determined for user 100.

Acoustic transfer function 602 defines the change to sound 230 as the sound propagates through interior 404 to microphone 106. Microphone 106 may not be located in an entrance to the ear canal of user 100, however, microphone 106 may located near the entrance. Therefore, output signal 234 detected by microphone 106 can serve as a proxy for the sound actually heard at the ear canal entrance. That is, the location of microphone 106 can be correlated to the ear canal, and acoustic transfer function 602 can serve as a proxy for a true acoustic transfer function relating input signal 232 to a pressure generated at the ear canal entrance.

In an aspect, the one or more processors determine acoustic transfer function 602 in response to detecting that user 100 has donned or repositioned headphones 104. By way of example, headphones 104 can incorporate a proximity sensor that detects when earcup 108 or earbuds 502 are placed against the head or within the ear of user 100. Similarly, headphones 104 can incorporate an accelerometer that detects when earcup 108 or earbuds 502 are moved, e.g., during adjustment of headphones 104, while on user's head. Detection of the placement or repositioning can trigger monitoring of output signal 234 that is generated by speaker 228 via playback of input signal 232. The monitored output signal 234 and the predetermined input signal 232, e.g., audio data 206, can be used to determine acoustic transfer function 602 in real-time. The real-time determination can allow acoustic transfer function 602 to be accurately estimated based on user/headphone interactions, e.g., based on a current placement of headphones 104 on the user's head.

At operation 308, device processor 202 or headphone processor 224 can determine an HRTF or an HpEQ filter based on acoustic transfer function 602. The acoustic path between speaker 228 and microphone 106 of circumaural headphones 402 can be specific to a geometry of user's ears, given that the reflections and diffractions of sound 230 along the path depends on the unique shape of pinna 406. Similarly, the acoustic path between speaker 228 and microphone 106 of earbuds 502 can be specific to the geometry of user's ears, given that the reflections and diffractions of sound 230 along the path depends on the unique shape of pinna 406. In either case, acoustic transfer function 602 between the speaker input and the microphone output will contain information specific to the outer ear of user 100. That user-specific information can be used to select or design audio filters that are personalized for user 100, such as a personalized HRTF or a personalized HpEQ filter, as described below In an aspect, an audio filter can be applied to input signal 232 delivered to speaker 228 to render binaural audio to user 100. When reproduced sound 230 is played to user 100, errors can be introduced by headphones 104 and/or the interaction between the headphones 104 and the ear of user 100. For example, reflections and reverberations of sounds 230 within interior 404 of earcup 108 can negatively impact the reproduced sound 230. Typically, headphones 104 can have a general equalization filter that is preset. The audio filter can be an HpEQ filter that modifies input signal 232 such that a pressure at an entrance to the ear canal of user 100 is approximately matched to a sound that the binaural rendering is intended to reproduce. In reality, however, generalized filters are not user-specific and do not sufficiently compensate for the effect of the combined user anatomy/headphones system on sound 230. In other words, generalized filters may not convince user 100 that no headphones are being worn while auditioning a binaural audio rendering.

Rather than apply a general equalization filter to compensate for an acoustic transfer function of a listener, audio system 102 can apply a personalized HpEQ to input signal 232. The personalized HpEQ can modify the input signal to counteract the effect of acoustic transfer function 602. Accordingly, the intended sound can be faithfully reproduced the ear canal entrance.

In an aspect, the one or more processors of audio system 102 generate the HpEQ filter based on acoustic transfer function 602. Still referring to operation 308, determining HpEQ filter can include determining an inverse 604 of acoustic transfer function 602. More particularly, acoustic transfer function 602 can be inverted to generate an inverse acoustic transfer function 604. Inverse acoustic transfer function 604 may be an inverse 604 function that reverses acoustic transfer function 602. For example, as shown in FIG. 6, a graph of inverse acoustic transfer function 604 is a mirror image of a graph of acoustic transfer function 602. Accordingly, the application of both acoustic transfer function 602 and inverse acoustic transfer function 604 to input signal 232 will result in input signal 232, since functions 602 and 604 counteract each other. As such, any error introduced into the reproduced sound 230 by acoustic transfer function 602 can be compensated for or removed by inverse acoustic transfer function 604.

Still referring to operation 308, a personalized HpEQ filter or a personalized HRTF for user 100 can be determined by selecting one or more of the audio filters from a dataset of predetermined transfer functions. Acoustic transfer function 602, the HRTF for user 100, and the HpEQ filter for user 100 are all anatomy dependent, and accordingly, can be correlated to each other. More particularly, users having a particular acoustic transfer function are also likely to have a particular HRTF and/or HpEQ filter. An audio filter can be picked by matching the acoustic transfer function 602, which is specific to user 100, to predetermined acoustic transfer functions of other users. More particularly, if the acoustic transfer function of user 100 matches an acoustic transfer function of another user 100, an acoustic transfer function of several other users, or a statistical measure of acoustic transfer functions of several other users (e.g., a mean or median acoustic transfer function of several other users), then an audio filter of the other user(s) having the matching acoustic transfer function can be selected as the audio filter for user 100. The selected audio filter is likely to fit user 100 because the acoustic transfer function and audio filter are correlated through shared anatomical characteristics of user 100 and the other users.

Figure 7:
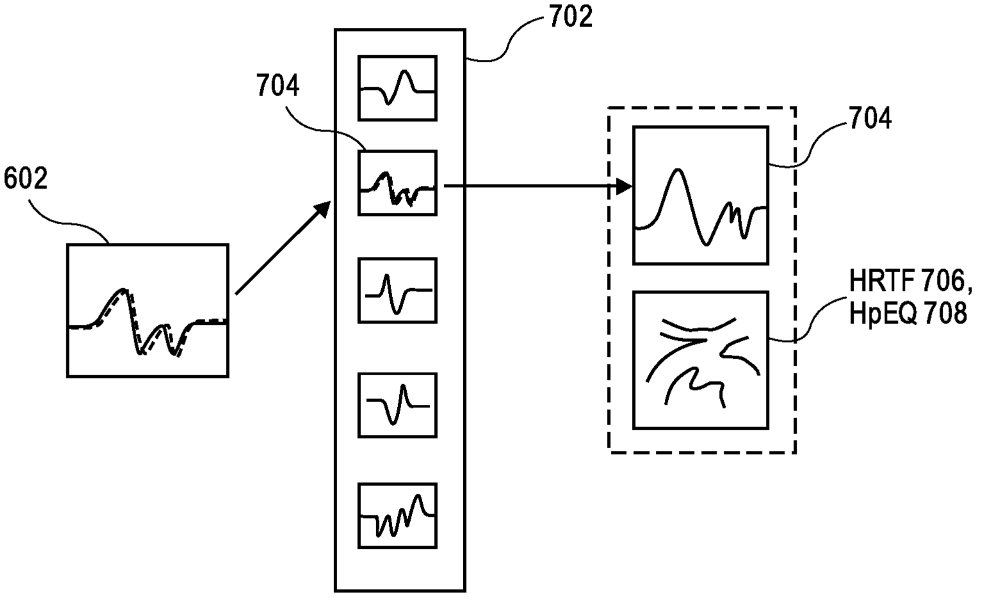
FIG. 7 is a pictorial view showing a determination of a head-related transfer function or a headphone equalization filter, in accordance with an aspect.

Referring to FIG. 7, a pictorial view showing a determination of an HRTF or HpEQ filter is illustrated in accordance with an aspect. The user-specific HRTF or HpEQ filter can be determined by referencing a dataset of transfer functions of other users. More particularly, the determination of the audio filter of interest (an HRTF or an HpEQ filter for user 100) can include comparing acoustic transfer functions 602 specific to user 100 to several predetermined transfer functions 702 of other users.

Predetermined transfer functions 702 can include graphical representations of acoustic transfer functions stored in a database. For example, transfer function database 210 stored in device memory 204 or headphone memory 226 can include a dataset of acoustic transfer functions that describe an impulse response of the other users. The stored transfer functions are dependent on the pinnas 406 of the other users, and accordingly, transfer functions similar to acoustic transfer function 602 are likely to be for users having similar anatomy to user 100. Device processor 202 or headphone processor 224 can perform a signal matching algorithm to compare acoustic transfer function 602 to each of predetermined transfer functions 702 to find a matching transfer function 704. For example, matching transfer function 704 may be an acoustic transfer function 602 of the other users that is a closest fit to acoustic transfer function of user 100.

Matching transfer function 704 can correspond to an audio filter, e.g., an HRTF 706 or an HpEQ filter 708 of the other user(s) that have matching transfer function 704. The audio filters can be, for example, generated in a laboratory using known techniques to develop the database of audio filters that correspond to anatomical characteristics of the users. Accordingly, when matching transfer function 704 is determined, the audio filter corresponding to matching transfer function 704, e.g., HRTF 706 or HpEQ filter 708, can be selected. Similarly, when matching transfer function 704 is determined, any other perceptual parameter can be extracted from the transfer function, and a corresponding audio filter can be selected based on the parameter. For example, the extracted parameter of the matching transfer function 704 can be used to determine HRTF 706 or HpEQ filter 708.

Operation 308 may include determining only one of HRTF 706 or HpEQ filter 708. By way of example, when headphones 104 are earbuds, speaker 228 delivers sound 230 directly into ear canal, and accordingly, earbuds 502 do not introduce headphone-related effects into the transmitted sound 230. More particularly, earbuds 502 have an auditioned sound output that is effectively equal to the input signal 232. Thus, there is no need to determine or apply an HpEQ filter 708 to the input signal 232 in the case of earbuds 502. Acoustic transfer function 602 may nonetheless be used to determine HRTF 706 of user 100. For example, acoustic transfer function 602 relating output signal 234 detected at stem 506 to input signal 232 can be used to select HRTF 706 specific to user 100. The measured acoustic transfer function 602 is anatomy-dependent because sound 230 reflects from pinna 406 as it travels out of the ear toward microphone 106 mounted on stem 506. This anatomical dependence provides that acoustic transfer function 602 corresponds to a particular HRTF 706 for the pinna shape. Accordingly, acoustic transfer function 602 represents the effect of pinna 406 on acoustics, which can be used to select HRTF 706 from transfer function database 210.

At operation 310, one or more processors of audio system 102 can apply one or more of the determined HRTF 706 or HpEQ filter 708 to input signal 232. When an optimized HRTF 706 and/or HpEQ filter 708 is selected and/or personalized to generate the individualized audio filters of user 100, audio system 102 can use the individualized audio filters to render binaural audio to user 100. Binaural rendering of audio to user 100 can include applying the individualized audio filters to a second input signal. The second input signal can be a portion of user content signal 208, e.g., a different portion of user content signal 208 than the first input signal that was played at operation 302. HRTF 706 and HpEQ filter 708 can be combined to achieve a single linear transfer function that generates a spatial input signal based on second input signal. More particularly, the spatial input signal can be generated by applying a selected HRTF 706 of user 100 to second input signal to generate an intended binaural audio signal. The intended binaural audio signal may, however, not account for the effect of acoustic transfer function 602 when the intended binaural audio signal is played by speaker 228. Accordingly, a selected or generated HpEQ filter 708, which is an inverse function of acoustic transfer function 602 of user 100, can be applied to the intended binaural audio signal to generate a modified binaural audio signal. The modified binaural audio signal can be the spatial input signal.

At operation 312, audio system processor(s) can drive speaker 228 with the spatial input signal to generate a spatialized sound. The spatial input signal can be transmitted to headphones 104 for playback to user 100. More particularly, when speakers 228 of headphones 104 play the spatial input signal, the spatialized sound can be emitted to render binaural audio to user 100.

The reproduced audio, which is based on the individualized audio filters that are specific to an anatomy of user 100, can improve an illusion of external sound sources in spatial audio and improve the overall sound quality experienced by user 100. The improvement can be transparent to user 100 because the determination of acoustic transfer function 602, HRTF 706, or HpEQ filter 708 can take place while delivering audio to user 100 without requiring input by user 100. The determination of acoustic transfer function 602 and derivation of audio filters by selection or generation can occur in an uncontrolled environment, and thus, can be performed seamlessly and with relative ease as compared to developing user-specific HRTF and HpEQ filters for a user in a controlled laboratory setting.

As described above, one aspect of the present technology is the gathering and use of data available from various sources to determine an HRTF or an HpEQ filter for a user. The present disclosure contemplates that in some instances, this gathered data may include personal information data that uniquely identifies or can be used to contact or locate a specific person. Such personal information data can include demographic data, location-based data, telephone numbers, email addresses, TWITTER ID's, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to determine the HRTF or the HpEQ filter for the user. Accordingly, use of such personal information data provides an improved spatial audio experience to the user. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of spatial audio rendering, the present technology can be configured to allow users to select to "opt in" or "opt out" of participation in the collection of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, the HRTF or the HpEQ filter can be determined by inferring preferences based on non-personal information data or a bare minimum amount of personal information, such as the content being requested by the device associated with a user, other non-personal information available to the device processors, or publicly available information.

To aid the Patent Office and any readers of any patent issued on this application in interpreting the claims appended hereto, applicants wish to note that they do not intend any of the appended claims or claim elements to invoke 35 U.S.C. 112(f) unless the words "means for" or "step for" are explicitly used in the particular claim.

In the foregoing specification, the invention has been described with reference to specific exemplary aspects thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A method, comprising:

driving, by one or more processors, a speaker of a headphone with an audio content signal to generate a sound, wherein the speaker is arranged to direct the sound into an ear of a user of the headphone;

capturing, by an external microphone of the headphone, the sound of the audio content signal as a microphone signal;

determining, by the one or more processors, an acoustic transfer function using the audio content signal and the microphone signal, the acoustic transfer function is based at least part on an acoustic path between the speaker and the external microphone; and selecting, by the one or more processors, a spatial audio filter corresponding to a predetermined transfer function matching the acoustic transfer function, wherein the spatial audio filter includes one or more of a head-related transfer function (HRTF) or a headphone equalization (HpEQ) filter of the user.

2. The method of claim 1, wherein the acoustic transfer function is determined responsive to receiving sensor data, from a sensor of the headphone that indicates that the user has either just donned the headphone or repositioned the headphone that is being worn by the user.

3. The method of claim 1, wherein selecting the spatial audio filter includes comparing the acoustic transfer function to a plurality of predetermined transfer functions of other users, and determining the HRTF corresponds to the predetermined transfer function of the plurality of predetermined transfer functions.

4. The method of claim 1, wherein selecting the spatial audio filter includes comparing the acoustic transfer function to a plurality of predetermined transfer functions of users, and determining the HpEQ filter corresponds to the predetermined transfer function of the plurality of predetermined transfer functions.

5. The method of claim 1, wherein the audio content signal is a first audio content signal, wherein the method further comprises:

applying, by the one or more processors, one or more of the HRTF or the HpEQ filter to a second audio content signal to generate a spatial audio content signal; and driving, by the one or more processors, the speaker with the spatial audio content signal to generate a spatialized sound.

6. The method of claim 5, wherein the first audio content signal and the second audio content signal are portions of a user content signal.

7. The method of claim 1, wherein the headphone is a circumaural headphone having an earcup that includes 1) the external microphone and 2) an internal microphone and the speaker contained within an interior of the earcup, wherein the earcup encloses a pinna of the user wearing the headphone, and wherein the sound is reflected from the pinna of the user.

8. The method of claim 1, wherein the headphone is an earbud having an output port to emit the sound internal to a pinna of the user, and a stem, and wherein the external microphone is mounted on the stem to receive the sound external to the pinna of the user.

9. An audio system, comprising:

a headphone including a speaker to generate a sound based on an audio content signal, and a microphone that is facing a surrounding environment of the headphone to capture the sound of the audio content signal reflected as an output signal; and one or more processors configured to determine an acoustic transfer function using at least the audio content signal and the output signal, the acoustic transfer function is based at least part on an acoustic path between the speaker and the microphone, and select a spatial audio filter corresponding to a predetermined transfer function matching the acoustic transfer function, wherein the spatial audio filter includes one or more of a head-related transfer function (HRTF) or a headphone equalization (HpEQ) filter of a user.

10. The audio system of claim 9, wherein the one or more processors are configured to determine the acoustic transfer function responsive to receiving sensor data, from a sensor of the headphone that indicates that the user has either just donned the headphone or repositioned the headphone that is being worn by the user.

11. The audio system of claim 9, wherein selecting the spatial audio filter includes:

comparing the acoustic transfer function to a plurality of predetermined transfer functions based on acoustic transfer functions of other users, and determining the one or more of the HRTF or the HpEQ filter corresponds to the predetermined transfer function of the plurality of predetermined transfer functions.

12. The audio system of claim 9, wherein the microphone is a first microphone, wherein the headphone is a circumaural headphone having an earcup that includes the speaker and a second microphone contained within an interior of the earcup, wherein the sound reflects from a pinna of the user enclosed by the earcup.

13. The audio system of claim 9, wherein the headphone is an earbud having an output port to emit the sound into an ear canal of the user internal to a pinna of the user, and a stem, and wherein the microphone is mounted on the stem to receive the sound external to the pinna of the user.

14. A non-transitory machine readable medium storing instructions executable by one or more processors of an audio system to cause the audio system to perform a method comprising:

driving, by one or more processors, a speaker of a headphone with an audio content signal to generate a sound;

capturing, by a microphone that is on an external surface of the headphone, the sound of the audio content signal reflected as an output signal;

determining, by the one or more processors, an acoustic transfer function using the audio content signal and the output signal, the acoustic transfer function is based at least part on an acoustic path between the speaker and the microphone; and selecting, by the one or more processors, a spatial audio filter corresponding to a predetermined transfer function matching the acoustic transfer function, wherein the spatial audio filter includes one or more of a head-related transfer function (HRTF) or a headphone equalization (HpEQ) filter of a user.

15. The non-transitory machine readable medium of claim 14, wherein determining the acoustic transfer function is performed in response to detecting that the user one or more of donned or repositioned the headphone.

16. The non-transitory machine readable medium of claim 14, wherein selecting the spatial audio filter includes:

comparing the acoustic transfer function to a plurality of predetermined transfer functions of other users, and determining the one or more of the HRTF or the HpEQ filter corresponds to the predetermined transfer function of the plurality of predetermined transfer functions.

17. The non-transitory machine readable medium of claim 14, wherein the audio content signal is a first audio content signal, wherein the non-transitory machine readable medium further comprising:

applying, by the one or more processors, one or more of the HRTF or the HpEQ filter to a second audio content signal to generate a spatial audio content signal; and driving, by the one or more processors, the speaker with the spatial audio content signal to generate a spatialized sound.

18. The method of claim 1, wherein the spatial audio filter includes, based on a type of the headphone, only one or both of the HRTF or the HpEQ.

19. The audio system of claim 9, wherein the spatial audio filter includes, based on a type of the headphone, only one or both of the HRTF or the HpEQ.

20. The non-transitory machine readable medium of claim 14, wherein the spatial audio filter includes, based on a type of the headphone, only one or both of the HRTF or the HpEQ.

21. The non-transitory machine readable medium of claim 14, wherein the microphone is a first microphone, wherein the headphone comprises an earcup that includes a second microphone on an internal surface of the earcup.

* * * * *